United States Patent
Ziegelman

(10) Patent No.: US 7,658,039 B2
(45) Date of Patent: Feb. 9, 2010

(54) HOUSING MODULES WITH SOLAR PANELS AND BUILDINGS FORMED FROM STACKED MODULES

(76) Inventor: Robert L. Ziegelman, 36800 Woodward Ave., Suite 100, Bloomfield Hills, MI (US) 48304

(*) Notice: Subject to any disclaimer, the term of this patent is extended or adjusted under 35 U.S.C. 154(b) by 410 days.

(21) Appl. No.: 11/534,436

(22) Filed: Sep. 22, 2006

(65) Prior Publication Data
US 2007/0074463 A1 Apr. 5, 2007

Related U.S. Application Data

(60) Provisional application No. 60/719,630, filed on Sep. 22, 2005.

(51) Int. Cl.
*E04H 1/02* (2006.01)
(52) U.S. Cl. .......................... 52/79.1; 52/79.3; 52/79.5; 52/18; 52/71; 52/69
(58) Field of Classification Search .................. 52/200, 52/64, 66, 68, 70, 71, 79.5, 69, 72, 79.1, 52/143, 81.5, 18, 79.2, 79.3; 47/17, 1.01 R, 47/29.1, 29.3, 29.5
See application file for complete search history.

(56) References Cited

U.S. PATENT DOCUMENTS

| | | | | |
|---|---|---|---|---|
| 1,739,387 A | * | 12/1929 | Cope ............................... | 52/71 |
| 2,765,499 A | * | 10/1956 | Couse ............................ | 52/66 |
| 2,920,920 A | * | 1/1960 | Couse et al. ............. | 296/26.02 |
| 3,460,297 A | * | 8/1969 | Fritz ............................... | 52/66 |
| 3,462,891 A | * | 8/1969 | Smith ............................ | 52/18 |
| 3,707,813 A | * | 1/1973 | Cymbrowitz et al. ...... | 52/79.11 |
| 3,830,029 A | * | 8/1974 | Vance ......................... | 52/395 |
| 3,911,634 A | * | 10/1975 | Horowitz et al. ............. | 52/79.2 |
| 4,118,901 A | * | 10/1978 | Johnson ......................... | 52/18 |
| 4,635,412 A | * | 1/1987 | Le Poittevin ................. | 52/79.5 |
| 5,317,857 A | * | 6/1994 | Allison ........................ | 52/79.1 |
| 5,493,825 A | * | 2/1996 | Gaston ......................... | 52/200 |
| 6,647,683 B1 | * | 11/2003 | Thomsen et al. ........... | 52/302.1 |
| 6,688,055 B2 | * | 2/2004 | Lindsley .................... | 52/236.4 |

* cited by examiner

*Primary Examiner*—Phi Dieu Tran A
(74) *Attorney, Agent, or Firm*—Gifford, Krass, Sprinkle, Anderson & Citkowski, P.C.

(57) ABSTRACT

A building module for housing purposes comprises a rigid, rectangular, three-dimensional truss formed with four steel end columns and steel beams extending between the columns. Each module includes a floor panel extending between the four end columns, wall panels, and a roof panel extending from two of the end columns, parallel to the forward column and terminating a spaced distance from the two end columns. A first rectangular folding panel has one end hingedly attached to the edge of the roof panel termination and a second rectangular folding panel, larger than the first rectangular folding panel, has one end hingedly supported between the two end columns. The first and second rectangular folding panels may be folded into positions parallel to their roof panel with their edges overlapping to form a compact module.

10 Claims, 5 Drawing Sheets

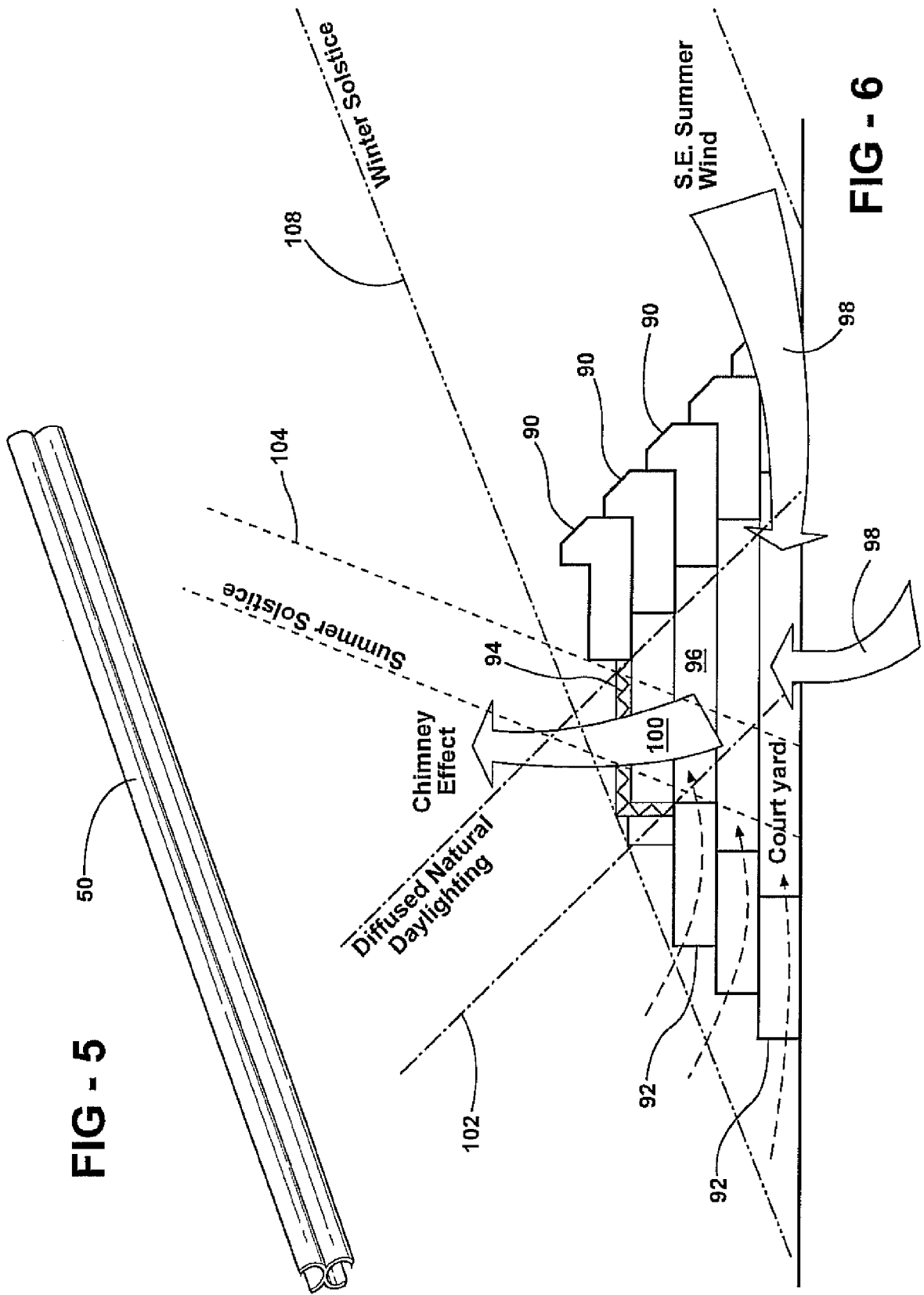

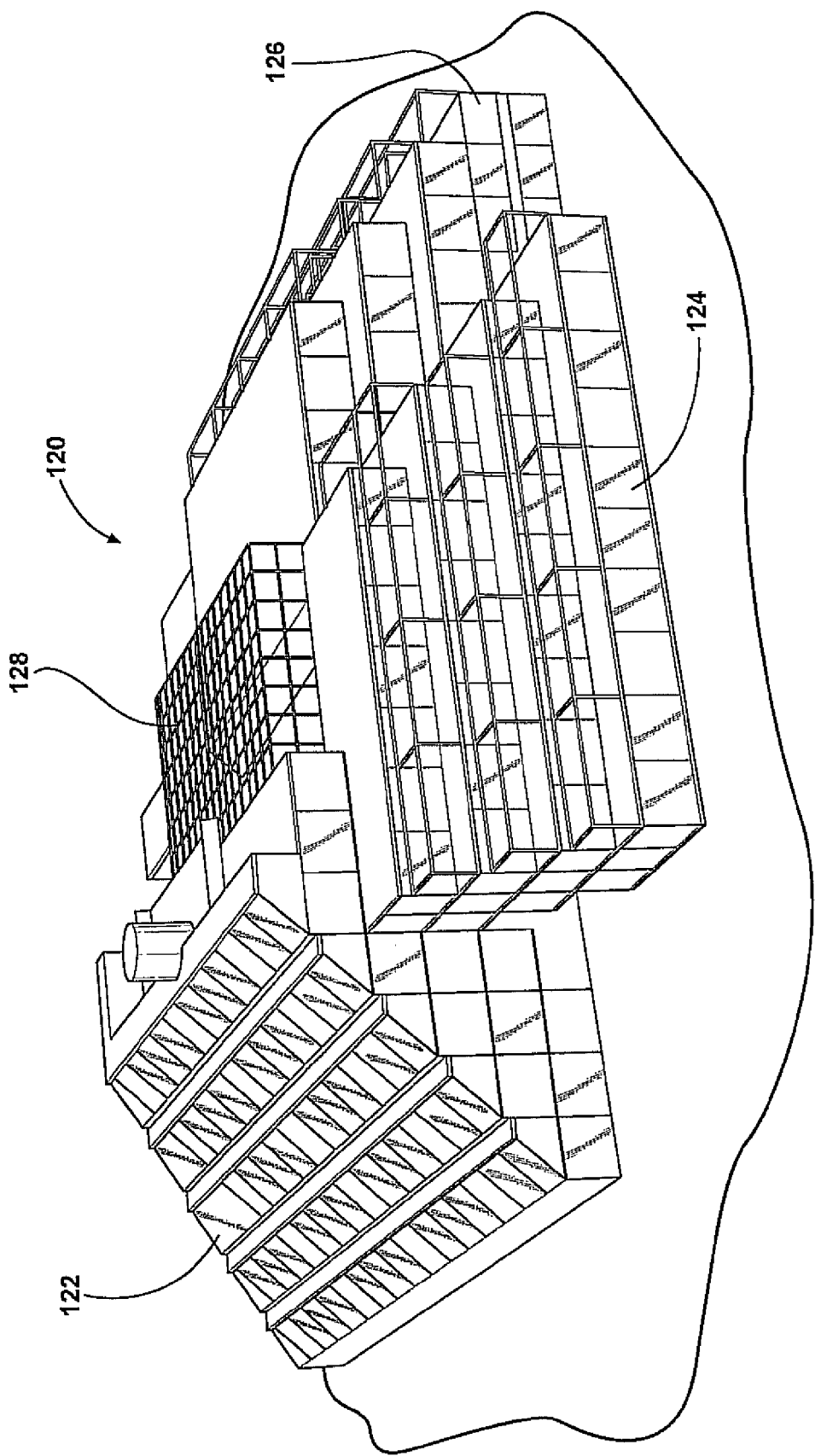

HOUSING MODULES WITH SOLAR PANELS AND BUILDINGS FORMED FROM STACKED MODULES

RELATED APPLICATION

This application claims priority of U.S. Provisional Patent Application Ser. No. 60/719,630 filed Sep. 22, 2005, which is incorporated herein by reference.

FIELD OF THE INVENTION

This invention relates to modular building units with solar panels that may be collapsed into a compact configuration for shipping or reconfigured into a form providing an elevated ceiling with an inclined wall over one end of the building module, and to building structures incorporating a plurality of modules stacked one above the other.

BACKGROUND OF THE INVENTION

Housing units formed in a factory are generally much more economical than units built on site because they enjoy the advantages of mass production. My U.S. Pat. No. 3,461,663 discloses a prefabricated building structure formed of a three-dimensional rectangular truss utilizing steel framing members. Modules may be erected in a factory and shipped to a building site where a number of modules may be joined together to form a larger structure.

Independently it has been proposed to join a plurality of modules to form multiple unit housing structures. See for example U.S. Pat. No. 6,651,393.

SUMMARY OF THE INVENTION

The present invention is accordingly directed toward a steel framed three-dimensional truss module which may be manufactured in a factory and transported to a building site where it may be erected independently or joined with a plurality of other modules to form a larger building structure.

The module of the present invention preferably comprises a rigid, rectangular, three-dimensional truss formed of tubular steel columns and beams. The module may be subdivided by internal vertical partitions to form more than one room and may be combined with similar modules to form housing units. Each module includes a floor panel, or panels, extending the full length of the unit and wall panels. A roof panel extends parallel to the floor panel from two of the end columns and terminates a spaced distance from the other two end columns. A first rectangular folding panel has one edge hinged to the edge of the roof panel termination and a second rectangular folding panel, larger than the first panel, has one edge hinged to a beam extending between the upper ends of the other two end columns.

The first and second rectangular panels may be folded into positions parallel to the roof panel with their ends opposite to the hinged edges in overlapping relationship to create a compact configuration suitable for shipping. When at the building site the first panel may be positioned upwardly, at substantially a right angle to the fixed roof panel, and the second rectangular panel may be erected to an acute angle relative to the roof panel so that an extension of its plane intersects the plane of the first panel. The free ends of the first and second panels may be connected, preferably by means of a smaller panel hinged to the free edge of the first panel, which is preferably positioned parallel to the roof panel, to form an elevated ceiling area over one portion of the module.

In one preferred embodiment of the invention, the inclined folding panel supports a solar panel which provides electrical power for the building module and may be interconnected with other solar panels supported on the walls of the building module or with solar panels on adjoining modules. Alternatively the solar panel may be connected to an electrical grid so as to draw power from the grid when the solar-generated power is insufficient to power the module or to provide excess power which may be sold to the grid.

The building modules include lifting hooks or the like connected to the tops of the opposed ceiling beams to allow lifting of the module for transportation and erection at a site.

A plurality of modules may be joined together to form a multi-unit housing structure by stacking the modules vertically with part of the floor of a superior module resting on the fixed roof panel of the inferior module. One end of the superior module will cantilever beyond the roof of the inferior module and the opposite end panel of the superior module will rest against the upwardly folding ceiling portion of the inferior module. Thus, the modules form an inclined vertical stack. This provides an aesthetically pleasing structure with each module receiving maximum exposure to the exterior of the structure. A group of stacks may be joined together in a pyramid-type construction providing a central courtyard with an open top which provides a chimney ventilation to the multiple unit structure.

BRIEF DESCRIPTION OF THE DRAWINGS

Other objects, advantages and applications of the present invention will be made apparent by the following detailed description of several preferred embodiments of the invention. The description make reference to the accompanying drawings in which:

FIG. 5 is a perspective view of a molding used to join the foldable building panels of the modules illustrated in FIGS. 1, 2 and 3 into a locked, open position;

FIG. 6 is a schematic view of a plurality of modules formed in accordance with the present invention stacked to form a building structure in accordance with the present invention, illustrating the central courtyard created and the chimney effect for air circulating and the lighting effect achieved by the courtyard; and FIG. 7 is a perspective view of a building formed by a plurality of modules of the present invention.

DETAILED DESCRIPTION OF THE PREFERRED EMBODIMENTS

The building module of the present invention may be used to form residences such as single family housing units or a plurality of modules may be joined to form multifamily housing units. The modules may also be used for commercial buildings including retail and office buildings or manufacturing buildings such as factories.

Since the modules can be shipped and erected at a site in only a fraction of the time required to build conventional housing structures or the like, they provide an excellent solution for creating housing and other buildings to replace units destroyed in a natural disaster such as hurricanes.

Figure 1:
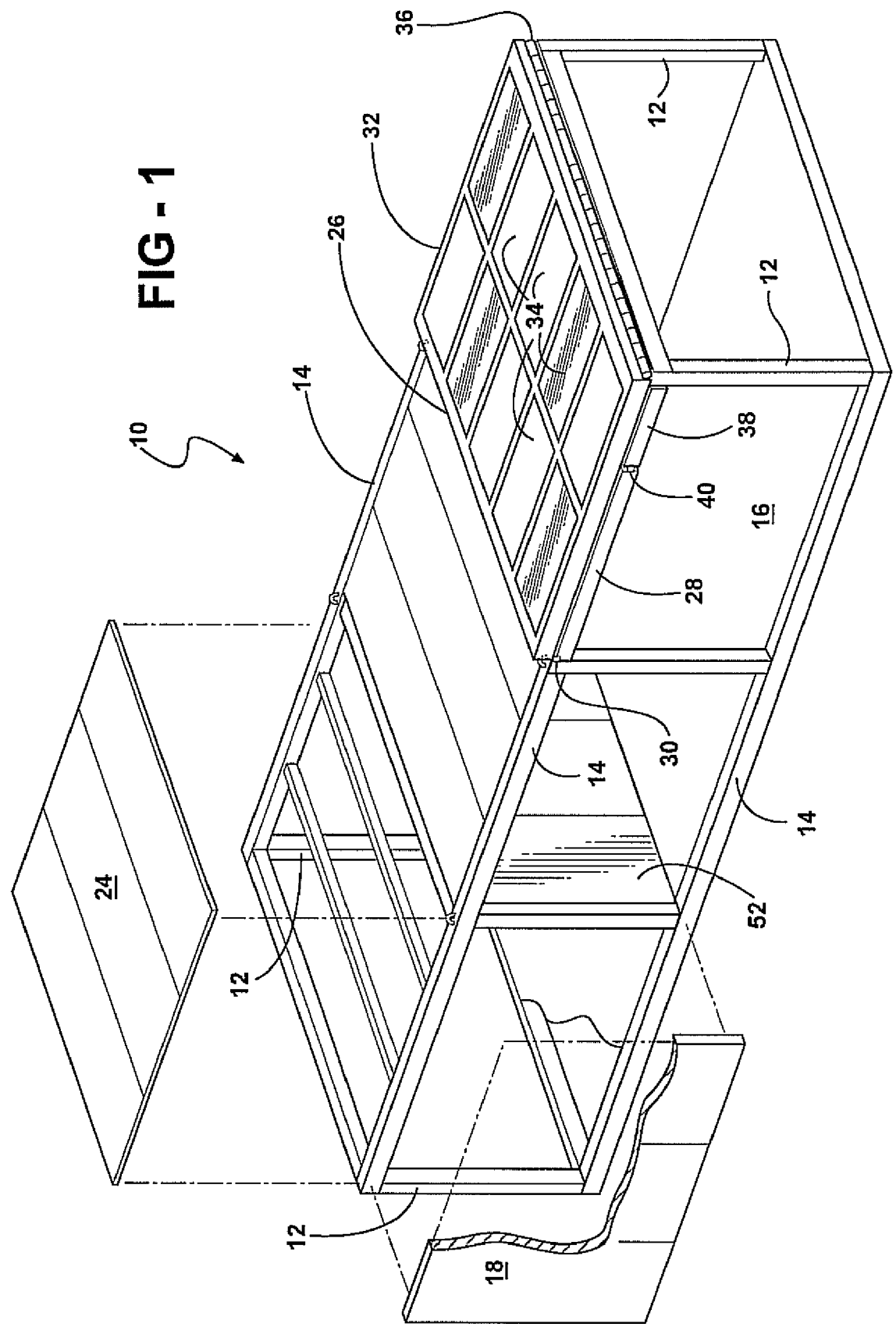
FIG. 1 is a perspective view of a building module forming a first preferred embodiment of the invention, partially broken away, in a folded position suitable for transportation to a building site.
Figure 2:
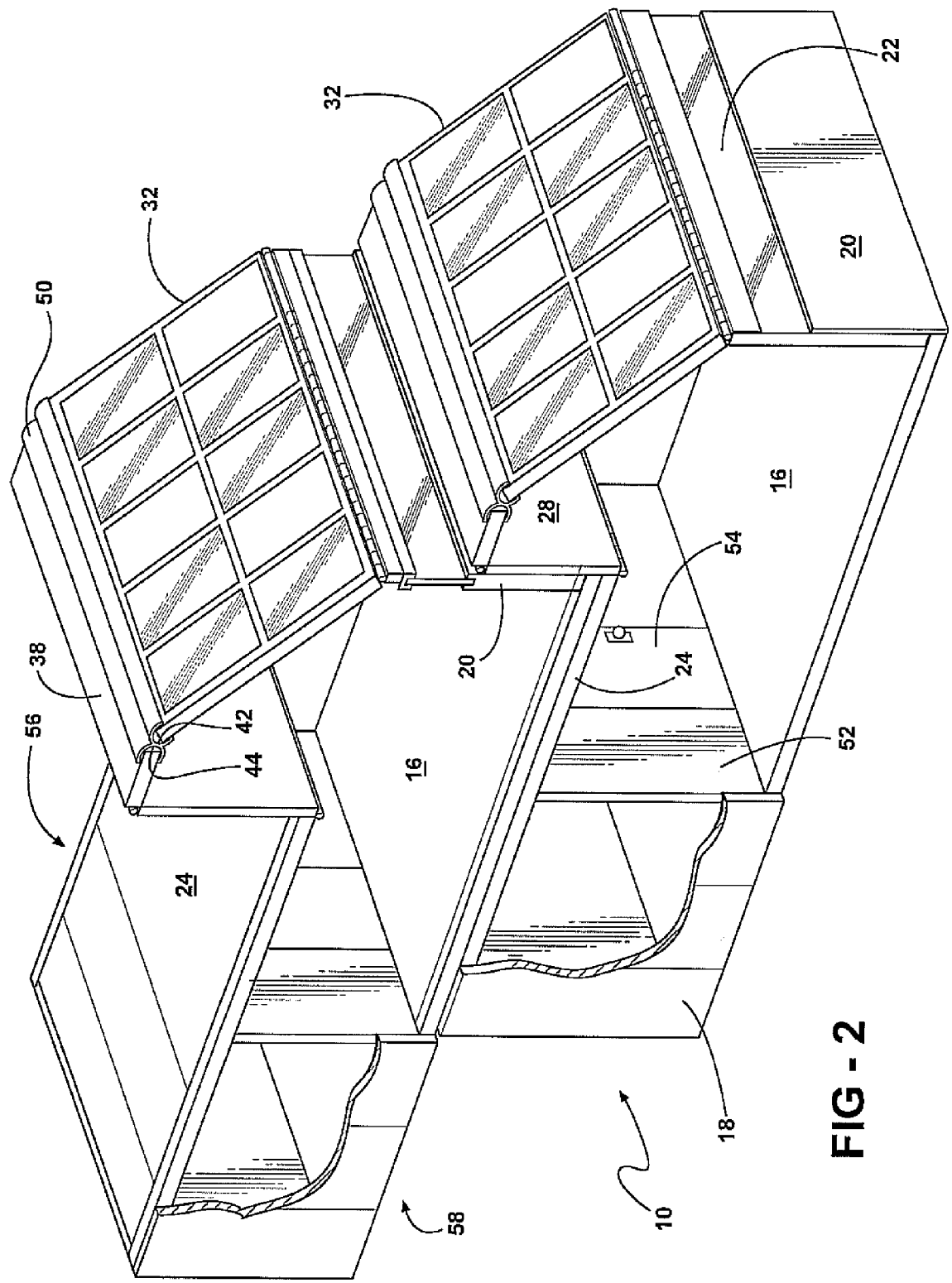
FIG. 2 is a side perspective view of a pair of modules, of the type illustrated in FIG. 1, partially broken away, in open position to form elevated ceiling areas over parts of the modules, stacked one above the other to form a multiple unit housing building structure.

The preferred embodiment of a building module formed in accordance with the present invention is shown in partially broken away form in FIG. 1. The module, generally indicated at 10, is built upon a rectangular grid structure involving at least four vertical corner columns 12 interconnected at their upper and lower ends by horizontal beams 14 formed by elongated structural members. The elongated structural members are preferably steel tubes, which are preferably rectangular in cross section. The bottom of a module is entirely covered by a floor panel 16 and the sides are covered by wall panels 18. As shown in FIG. 2, one end wall panel 20 is illustrated as having a window panel 22 extending along its top edge. Other window panels and door panels may be appropriately located in the side panels 18. All of these panels are preferably detachable from the rectangular grid formed by the columns 12 and the beams 14 in order to alter the configuration of the module or replace defective panels.

The roof and ceiling of the module 10 is partially covered by a panel 24 which extends between a first pair of corner beams over a portion of the ceiling and terminates at an edge 26 which is spaced from and extends parallel to align between the opposite end columns. A first rectangular foldable panel 28 is supported on the free edge of the roof panel 24 by a hinge 30. The hinge allows the panel 28 to move between a closed position, in which it lies parallel to the floor panel 16 and in the same plane as the partial roof panel 24, as illustrated in FIG. 1, or an erected position as shown in FIG. 2 in which it extends generally vertically upward relative to the roof panel 24.

A second hinged roof panel 32, which has a plurality of solar panels 34 supported thereon, is connected by a hinge 36 to the beam extending across the upper end of the module above the panel 20. A third panel 38 is joined by a hinge 40 to the free end of the panel 28. The hinge 38 allows it to pivot between a position wherein the plane of the panel 38 lies in the same plane as the panel 28 or at right angles to that panel as shown in FIG. 2.

The panels 32 and 38 have knobbed extrusions 42 and 44 on their free edges (FIG. 2).

When the hinged sections are folded into a compact configuration for shipment of the module 10, as illustrated in FIG. 1, the panels 28, 32 and 44 all lie parallel to the roof panel 24, with the panel 32 overlying the panels 28 and 38. In order to create an elevated ceiling space about one end of the module, the panels are folded into the configuration illustrated in FIG. 2 wherein the panel 28 extends substantially normally to the roof 24, the panel 38 extends at right angles from the free end of the panel 28, and the panel 32 is inclined so its free end abuts the free end of the panel 38. The free ends are joined by sliding an extrusion 50, illustrated in perspective in FIG. 5, over the sections 42 and 44, so as to join them and seal the space between them.

The modules 10 may include one or more internal partitions 52 to divide the interior volume into separate rooms which may be connected by doors 54.

FIG. 2 illustrates a manner in which two of the modules 10 may be stacked on one another to form a multi-module structure. The superior unit, generally indicated at 56, is supported with its floor 16 on top of the roof 24 of the inferior unit, generally indicated at 10. A section of the superior unit 56, generally indicated at 58, cantilevers out beyond the far wall of the inferior module. The wall 20 of the superior module 56 abuts the panel 28 of the inferior unit. In this form the inclined panels 32 of both units are generally aligned with one another, and the units form an upwardly inclined assembly.

Figure 3:
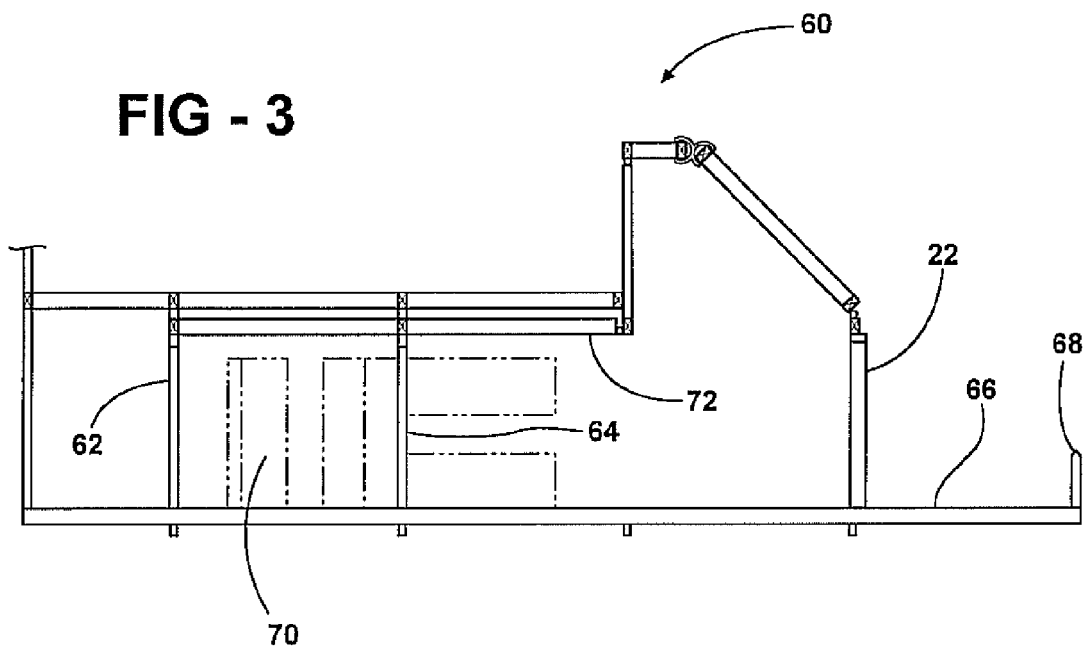
FIG. 3 is a side view of a building module forming a second preferred embodiment of the invention, with the side panels removed, to show the internal wall structure.

FIG. 3 illustrates an alternative embodiment of the invention, generally indicated at 60, which is a variation of the module 10 illustrated in FIG. 1. This unit has a pair of interior walls 62 and 64 dividing the interior module into three rooms. It additionally has an extension of the bottom horizontal beams of the unit at 66 which extend forwardly of the wall 22 and are covered by an appropriate flooring to form a balcony. A rail 68 extends around the open sides of the balcony, appropriate furniture items 70 are illustrated in phantom within the unit.

Figure 4:
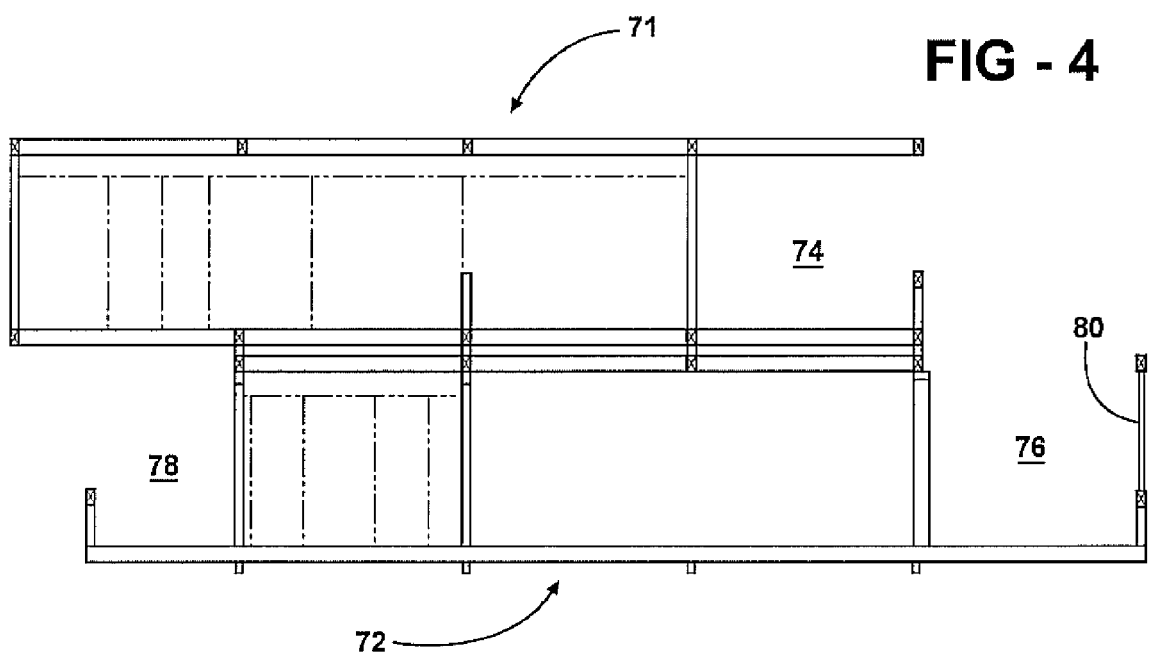
FIG. 4 is a side view, with the side panels removed, of a pair of building modules which may be joined to the other building modules to form a multiple unit building structure.

FIG. 4 illustrates a pair of modules forming alternative embodiments of the invention, which may be stacked relative to one another or intermixed with the units illustrated in FIGS. 1 and 3 to form a multi-apartment unit. A module generally indicated at 71 is supported above a module generally indicated at 72. The module 71 has a covered floor or porch 74 and the module 72 has a balcony unit with a glass guardrail 80 and a rear balcony unit 82. Otherwise the modules are built with the same rectangular tubular truss framework as the module of FIG. 1.

FIG. 6 schematically illustrates how a plurality of modules of a first form, 90, generally like the modules of FIG. 1, may be stacked above one another and another plurality of modules, like the modules in FIG. 4, indicated at 92, may be stacked in opposition in an inclined manner relative to the first modules. The manner of stacking the modules of FIG. 1, as illustrated in FIG. 2, produces an upwardly inclined stack since the modules 92 are stacked so that superior modules are supported on a portion of the roof of the inferior modules and their ends cantilevered beyond the roof, giving the same angled stagger as the modules 90.

The roof section above the top units may be open and connected by a steel truss grid 94. The arrangement is such as to create a central courtyard, indicated at 96. The courtyard acts to provide a chimney effect so that breezes entering alongside the lower units, indicated by the arrows 98, will be carried upwardly by convection currents, indicated by arrow 100, as a result of the chimney effect of the two converging structural elements. Two or more structural stacks may be incorporated on one or more of the opposed sides to completely close the chimney. The opening 94 is such as to provide light to the interior of the central courtyard; lines indicate the diffused natural daylight, generally indicated at 102, the light projecting during the summer solstice given an appropriate orientation, generally indicated at 104, and the general projection of light arriving in the winter solstice, generally indicated at 108, relative normal to the inclination of the angled surfaces of the modules 90 which may carry solar panels or alternatively windows or some combination thereof.

FIG. 7 illustrates a multi-unit building, generally indicated at 120, constructed from a stack 122 of modules of the type illustrated in FIG. 1, and groups 124 and 126 of modules generally of the type illustrated in FIG. 3, with the top of the resulting central courtyard covered by a grid 128.

Having thus described my invention, I claim:
1. A building module, comprising:
   a rectangular, three-dimensional truss framed with four steel end columns and steel beams extending between the columns;
   a floor panel extending between the four end columns;

wall panels;

a roof panel extending from two of the end columns, parallel to the floor panel, and terminating at a spaced distance from the other two end columns;

a first rectangular folding panel having one edge hingedly attached to the edge of the roof panel termination and an opposed, free edge;

a second rectangular folding panel, larger than the first rectangular folding panel, having one edge hingedly supported between the other two end columns;

whereby the first and second rectangular folding panels may be folded into positions parallel to the roof panel with their ends opposite to the hinged edges in overlapping relationship, or the first and second rectangular hinge panels may be positioned at angles to the roof panel so that projections of the planes of the first and second folding panels intersect one another, forming an elevated roof section over the portion of the module under the first and second rectangular folding panels relative to the elevation of the rest of the roof section of the module.

2. The building module of claim 1 further including:

a third roof panel hinged to the free edge of the first rectangular folding panel and adapted to lie parallel to the roof panel when the first and second rectangular folding panels are folded into position parallel to the roof panel and adapted to extend at an angle to the free edge of the first hinged roof panel when the first and second rectangular hinge panels are positioned at angles to the roof panel so that the free edge of the third rectangular hinged panel is positioned adjacent to the free edge of the second hinged roof panel and supports the first and second hinged roof panels in their angled position.

3. The building module of claim 1, wherein at least one of the first and second rectangular folding panels supports a planar solar panel.

4. The building module of claim 1, wherein, when the first and second rectangular folding panels are positioned at angles to the roof panel so that projections of the planes of the first and second hinge panels intersect one another, the first rectangular folding panel is supported at substantially right angles to the roof panel and the second rectangular folding panel is disposed at an acute angle relative to the roof panel.

5. The building module of claim 2, wherein a third roof panel is disposed substantially parallel to the roof panel when the first and second hinged panels are positioned at angles to the roof panel so that projections of the planes of the first and second hinged rectangular panels intersect one another.

6. The building module of claim 1, wherein at least one of the first and second rectangular folding panels is formed with window panels.

7. The building module of claim 1, wherein all of the panels are detachable from the three-dimensional truss.

8. The building module of claim 1, further including separable fasteners secured to the beams framing the side of the three-dimensional truss opposite to the side supporting the floor panel for lifting of the module to transport the module to and from a building site.

9. A building structure formed with a plurality of building modules, each module comprising:

a rectangular, three-dimensional truss framed with four steel end columns and steel beams extending between the columns; a floor panel extending between the four end columns; wall panels; a roof panel extending from two of the end columns, parallel to the floor panel, and terminating at a spaced distance from the other two end columns; a first rectangular folding panel having one edge hingedly attached to the edge of the roof panel termination and an opposed, free edge; a second rectangular folding panel, larger than the first rectangular folding panel, having one edge hingedly supported between the other two end columns; whereby the first and second rectangular folding panels may be folded into positions parallel to the roof panel with their ends opposite to the hinged edges in overlapping relationship, or the first and second rectangular hinge panels may be positioned at angles to the roof panel so that projections of the planes of the first and second folding panels intersect one another, forming an elevated roof section over the portion of the module under the first and second rectangular folding panels relative to the elevation of the rest of the roof section of the module, the structure comprising a plurality of the modules stacked one above the other with the floor panel of an upper module resting on the roof panel of a lower module so that a portion of the floor panel of the upper module cantilevers beyond one edge of the lower module and the opposite end wall of the upper module extends parallel to the panel extending at substantially a right angle to the roof panel of the lower module, whereby the modules are staggered in a vertical direction relative to one another.

10. The building structure of claim 9, including two stacks of modules spaced from one another and disposed at upwardly inclined angles relative to one another so as form a central courtyard with an open top between the modules.

* * * * *

UNITED STATES PATENT AND TRADEMARK OFFICE
CERTIFICATE OF CORRECTION

PATENT NO. : 7,658,039 B2  Page 1 of 1
APPLICATION NO. : 11/534436
DATED : February 9, 2010
INVENTOR(S) : Robert L. Ziegelman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Thirtieth Day of November, 2010

David J. Kappos
*Director of the United States Patent and Trademark Office*